United States Patent
Swietek et al.

(10) Patent No.: US 7,590,899 B2
(45) Date of Patent: Sep. 15, 2009

(54) PROCESSOR MEMORY ARRAY HAVING MEMORY MACROS FOR RELOCATABLE STORE PROTECT KEYS

(75) Inventors: Donald J. Swietek, Lagrangeville, NY (US); Bruce G. Hazelzet, New Port Richey, FL (US); Roger A. Rippens, Salt Point, NY (US); Carl B. Ford, III, Poughkeepsie, NY (US); Kevin W. Kark, Poughkeepsie, NY (US); Pak-kin Mak, Poughkeepsie, NY (US); Liyong Wang, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 449 days.

(21) Appl. No.: 11/532,267

(22) Filed: Sep. 15, 2006

(65) Prior Publication Data

US 2008/0072109 A1 Mar. 20, 2008

(51) Int. Cl.
*G11C 29/00* (2006.01)
*G06F 11/00* (2006.01)
*G06F 13/00* (2006.01)

(52) U.S. Cl. .......................... 714/718; 714/8; 714/766; 714/773; 711/104; 711/164

(58) Field of Classification Search ............. 714/8, 714/718, 766, 773; 711/104, 164
See application file for complete search history.

(56) References Cited

U.S. PATENT DOCUMENTS 4,293,910 A * 10/1981 Flusche et al. ............... 711/157

(Continued)

OTHER PUBLICATIONS

NN72012363, Double Error Corrections Code with Separable Single Error Correcting Capability, IBM Technical Disclosure Bulletin, Jan. 1, 1972, vol. 14, Issue 8, pp. 2363-2365.*

(Continued)

*Primary Examiner*—John J Tabone, Jr.
(74) *Attorney, Agent, or Firm*—Lynn L. Augspurger; Robert R. Williams

(57) ABSTRACT

A DDR SDRAM DIMM for a mainframe main storage subsystem has a plurality of DDR SDRAMs on a rectangular printed circuit board having a first side and a second side, a length (152 MM=6 inch) between 149 and 153 millimeters and optimized at 149.15 mm or 151.35 mm in length and first and second ends having a width smaller than the length; a first plurality of connector locations on the first side extending along a first edge of the board that extends the length of the board, a second plurality of connector locations of the second side extending on the first edge of the board, a locating key having its center positioned on the first edge and located between 80 mm and 86 mm and optimized with a locating key 1.5 mm wide centered at 81.58 or 85.67 mm from the first end of the board and located between 64 and 70 mm and optimized with the locating key centered at 67.58 or 65.675 from the second end of the board. Each DIMM has memory regions comprising one of a plurality of physical entities hereafter referred to as memory macros which are relocatable regions which contain SP Keys and data set storage in the DIMM physical memory. These memory macros SP Key regions define an arbitrary logic structure for main storage which has a hard physical boundary.

18 Claims, 2 Drawing Sheets

U.S. PATENT DOCUMENTS

| | | | |
|---|---|---|---|
| 4,513,367 A * | 4/1985 | Chan et al. | 711/145 |
| 4,918,692 A * | 4/1990 | Hidaka et al. | 714/702 |
| 5,787,309 A * | 7/1998 | Greenstein et al. | 710/36 |
| 5,943,283 A * | 8/1999 | Wong et al. | 365/230.01 |
| 6,035,381 A * | 3/2000 | Mita et al. | 711/164 |
| 6,883,077 B2 * | 4/2005 | Kimura et al. | 711/164 |
| 7,171,591 B2 * | 1/2007 | Chen | 714/52 |
| 7,243,293 B2 * | 7/2007 | Chen | 714/781 |
| 7,272,775 B2 * | 9/2007 | Jacquet et al. | 714/766 |
| 2005/0262341 A1 * | 11/2005 | Field | 713/165 |
| 2007/0022360 A1 * | 1/2007 | Rai et al. | 714/773 |
| 2007/0079210 A1 * | 4/2007 | Bell et al. | 714/758 |
| 2007/0079216 A1 * | 4/2007 | Bell et al. | 714/763 |
| 2007/0079217 A1 * | 4/2007 | Haugan et al. | 714/763 |

OTHER PUBLICATIONS

NA83045836, Fault Dispersion in Computer Memories, IBM Technical Disclosure Bulletin, Apr. 1, 1983, vol. 23, Issue 11A. pp. 5836-5838.*

NN81034597, Parallel Implementation of Double Error Correction and Triple Error Detection, IBM Technical Disclosure Bulletin, Mar. 1, 1981, vol. 23, Issue 10, pp. 4597-4599.*

* cited by examiner

PROCESSOR MEMORY ARRAY HAVING MEMORY MACROS FOR RELOCATABLE STORE PROTECT KEYS

RELATED APPLICATION

This application is related to a co-pending application owned by the assignee International Business Machines Corporation, Sep. 15, 2006 entitled "Relocatable Storage Protect Keys for System Main Memory", by inventors Kevin Kark et al. U.S. Ser. No. 11/532294.

TRADEMARKS

IBM® is a registered trademark of International Business Machines Corporation, Armonk, N.Y., U.S.A. Other names used herein may be registered trademarks, trademarks or product names of International Business Machines Corporation or other company.

BACKGROUND OF THE INVENTION

1. Field of the Invention

This invention relates in general to an improved method of managing computer memory for computers and digital systems and, in particular, to the management of processor memory arrays with store protect keys by integrating storage protect keys (SP Keys) in main storage to share the same physical memory.

2. Description of Background

In past generations of digital and computer designs in the IBM z-Series architecture, there was provided a Store Protect Key (SP Key) which was a logical SP Key for every 4 KB of storage. Each SP key was 7 bits in length. The operating system, such as z/OS managed data access via these SP Keys. In a typical IBM z-Series system, having 512 GB of memory provided for main storage, this resulted in 128 million SP Keys. These keys were packages in prior systems with SRAM or a separate DRAM infrastructure.

As the technologies and designs have evolved, this is becoming increasingly more difficult. For example, there is a need to improve granularity and cost/performance in the memory storage capacity of advanced computer memory systems with higher density DRAM technology and packaging such as that provided by the memory described in IBM's "A high Reliability Memory Module with a Fault Tolerant Address and Common Bus", U.S. Pat. No. 7,234,099, granted Jun. 19, 2007, based on a application filed by Kevin C. Gower et al. U.S.Ser. No. 10/413605 of Apr. 14, 2003, which is incorporated herein by reference.

What is needed is a method and hardware that allows for maintaining a single copy of data sets with a plurality of instances in a mainframe computer system with increasing storage needs.

SUMMARY OF THE INVENTION

The present invention allows for the use of one copy of common data sets along with a plurality of instances in a mainframe computer system having massive storage needs by providing a relocatable SP Key region within the common physical memory as in main storage of the computer system.

The manner by which the present invention seeks to achieve these goals is by application of the disclosed method steps which can be generally applied to any memory design structure either hierarchical or flat in nature. Furthermore, our invention allows for compliance with the rules set forth in most common design environments requiring a consistent nomenclature for data sets representing a particular design entity.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
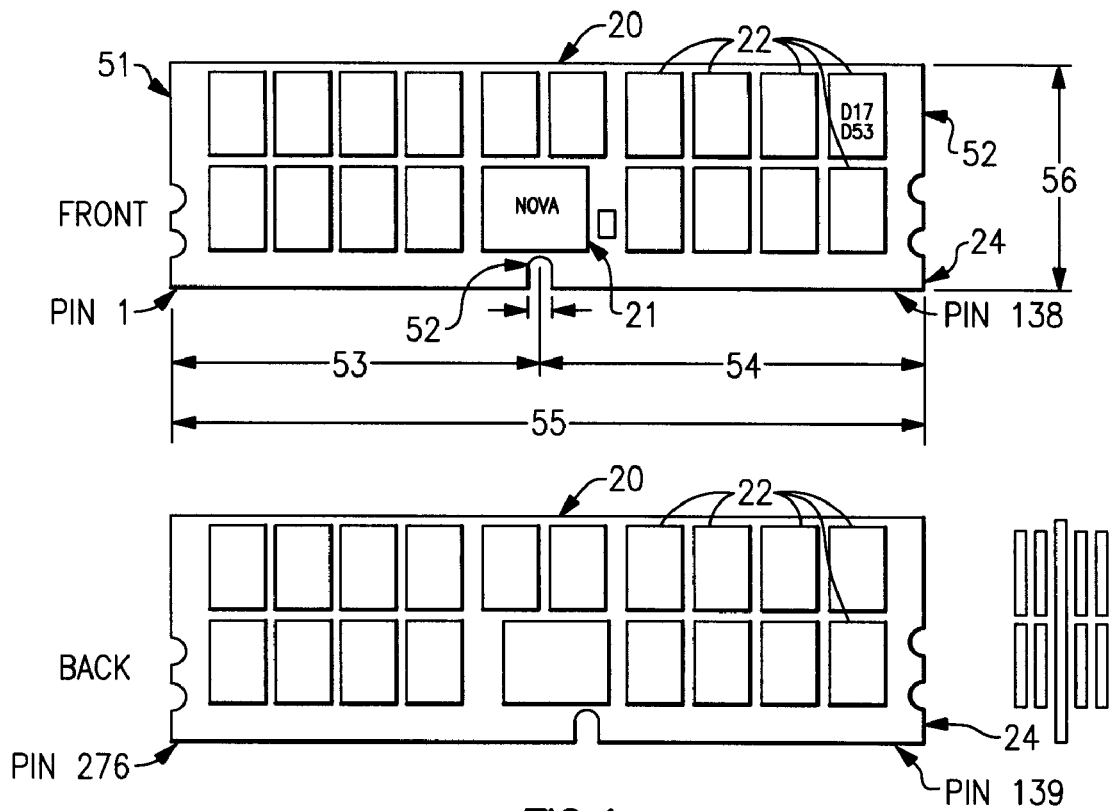
FIG. 1 shows a typical physical design topology for which our invention is intended to be used in a main storage DIMM, which illustrates stacked DRAMs, as opposed to the alternative view of single DRAMs illustrated by the memory module 20 shown in FIG. 2

Turning now to the drawings in greater detail, it will be seen that FIG. 1 depicts a typical physical design structure for a common physical memory as described in IBM's "A high Reliability Memory Module with a Fault Tolerant Address and Common Bus", U.S. patent referenced above, which is incorporated herein by reference.

In accordance with our invention the DIMM shown therein has been modified to provide in the DIMM shown in FIG. 1 comprising one of a plurality of storage regions defined in physical entities hereafter referred to as memory macro segments which are relocatable regions which contain SP Keys and data set main storage in the DIMM physical memory. These memory macro segments, including SP Key regions and data set main storage element regions, define an arbitrary logic structure for main storage which have a hard physical boundary with absolute dimensions, aspect ratios, wiring layers, and they serve as the lowest level objects in the design hierarchy and the SP Key regions can be physically relocated/moved to different main storage locations with their integrated SP Keys. The preferred DIMM differs from the referenced US patent incorporated by reference in that it is a DDR SDRAM DIMM for a mainframe main storage subsystem which has a plurality of DDR SDRAMs on a rectangular printed circuit board having a first side and a second side, a length 55 (152 MM=6 inch) between 149 and 153 millimeters and optimized at 149.15 mm or 151.35 mm in length and first and second ends (51,52) having a width 56 smaller than the length 55; a first plurality of connector locations 24 on the first side extending along a first edge of the board that extends the length of the board, a second plurality of connector locations 24 of the second side extending on the first edge of the board, a locating key 52 having its center positioned on the first edge and located between 80 mm and 86 mm and optimized with a locating key 1.5 mm wide (shown by arrows as width of locating key 52) centered at 53, 81.58 or 85.67 mm from the first end of the board and located between 64 and 70 mm and optimized with the locating key centered 54, at 67.58 or 65.675 from the second end of the board. Unlike the memory described in the referenced patent, each DIMM has memory regions which form part of the main storage of the mainframe computer system memory subsystem comprising one of a plurality of physical entities hereafter referred to as memory macros which are relocatable regions which contain SP Keys and data set storage in the DIMM physical memory which may be spread across several DIMMs. These memory macros SP Key regions define an arbitrary logic structure for main storage which have a hard physical boundary. In addition, we have provided in the registered buffer for the memory module special triple detect and double correct ECC matrix registered buffer SP Key protection.

FIG. 1 illustrates a stacked version of the memory module 20 having DRAMs 22 and a register buffer 21 with connectors 24 for coupling to a memory subsystem board where the layout is at the right of the top and back illustrations of the stacked version of the memory module. In FIG. 1 the register buffer is an IBM chip conforming to the AMB (Advanced Memory Buffer) used on the industry standard FBDIMM (Fully Buffered DIMM).

This improves Reliability, Availability and Serviceability and design commonality, and contributes to improved costs and performance. This was not possible with prior designs. In FIG. 1, the DIMM memory module has a plurality of DRAMS, and a register buffer for the memory module. Consistent with the design the register buffer manufactured by Philips Semiconductor as Part No. SSTU32964 shown in FIG. 2 conforming to the above referenced IBM patent, the Nova Buffer 21 shown in FIG. 1 is consistent with the forthcoming industry standard FBDIMM and is configured to provide a triple detect and double correct ECC matrix in the register buffer for SP Keys as well as data sets within the memory. Prior designs for SP Key regions were only provided with parity protection. In the register buffer a physical key consists of 7 bits of data and 9 bits of ECC which is 2 bytes in length. This additional ECC protection for SP Keys aids performance.

Figure 2:
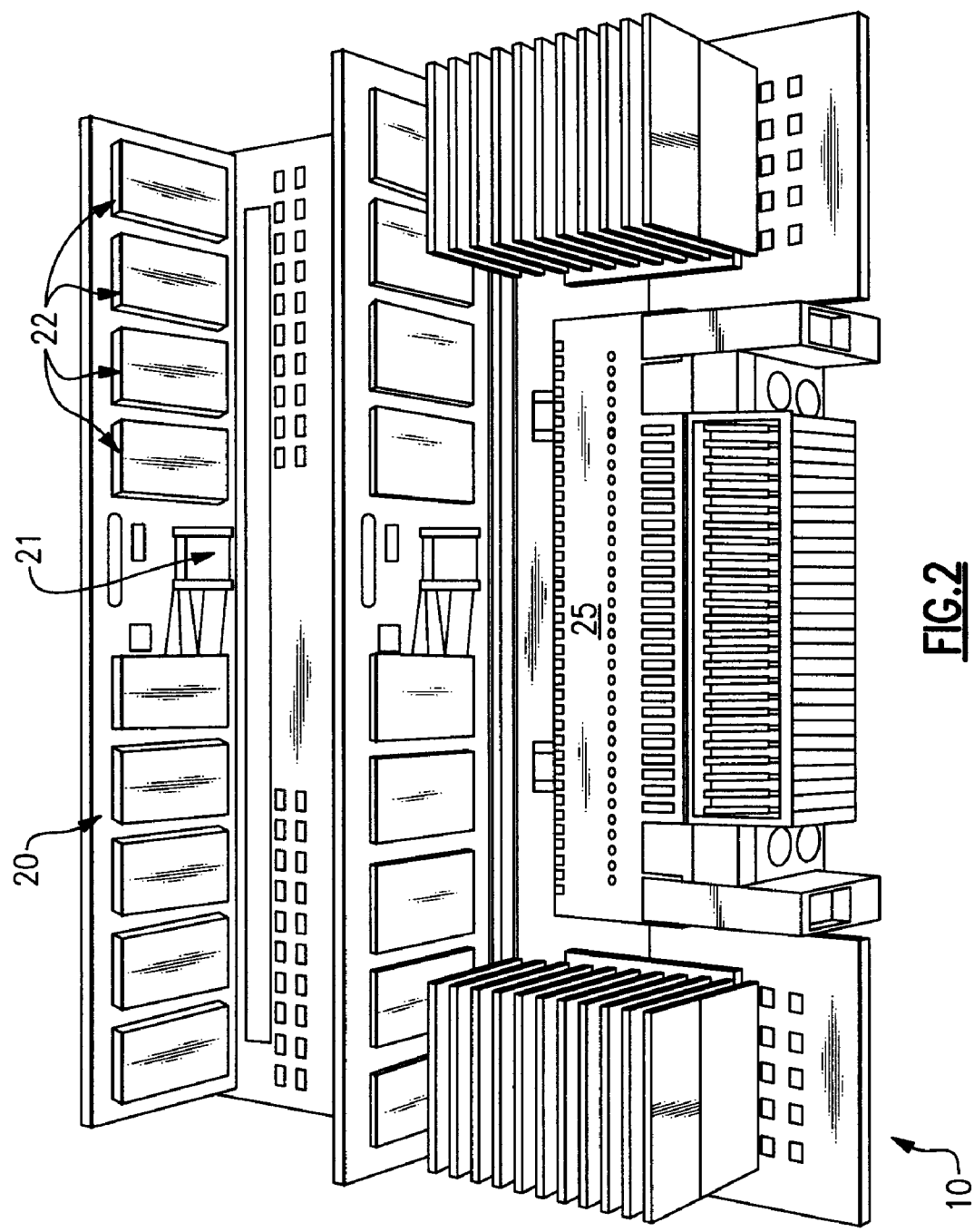
FIG. 2 describes the preferred memory main storage subsystem having a memory card arrangement of DIMMs for a mainframe computer system.

FIG. 2 illustrates the memory subsystem having a storage controller interface and preferred memory card arrangement for a mainframe computer system by enhancing an IBM clipper card arrangement holding a plurality of DIMMs with a DIMM having a plurality of DRAMs and the improved triple detect and double correct ECC matrix registered buffer for SP Keys as well as data sets within the memory. FIG. 2 shows the locating key having its center positioned on the first edge and located at 81.58 mm from the first end of the board and located centered at 67.58 mm from the second end of the board. FIG. 2 illustrates a straight layout version of the memory module 20 having DRAMs 22 and a register buffer 21 with connectors 24 for coupling to a memory subsystem board where the layout is at the right of the top and back illustrations of the stacked version of the memory module.

The alternative FIG. 2 DIMM has an optimized spacing of the locating key for a mainframe computer memory subsystem would provide the locating key having it centered positioned on the first edge and located at 85.67 mm from the first end of the board and located centered at 65.675 mm from the second end of the board. Generally herein, all dimensions can fall within 3.0 mm from the optimized position.

Figure 3:
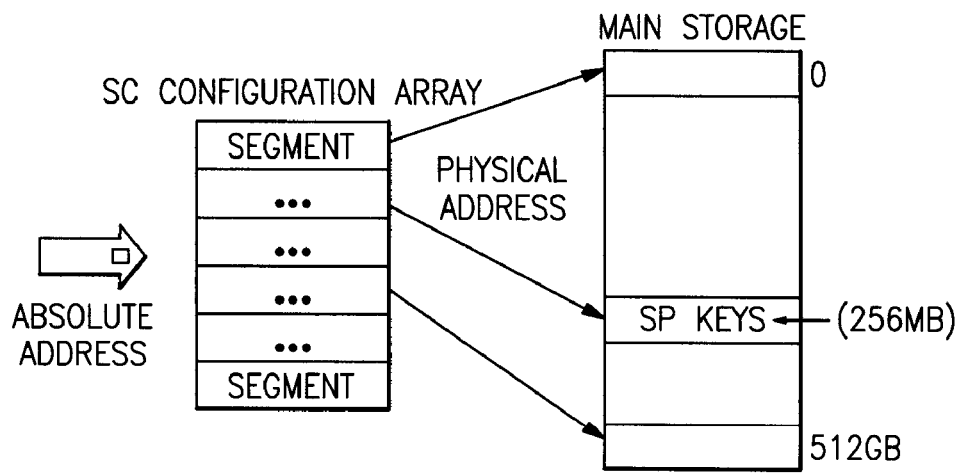
FIG. 3 shows the method mapping an absolute to physical address in the memory in which the SP keys are part of the physical main storage for memory of a mainframe computer system with a storage controller configuration array.

FIG. 3 shows the method mapping an absolute to physical address in the memory in which the SP keys are part of the physical main storage for memory of a mainframe computer system. As illustrated in FIG. 3, the main storage provided by a plurality of DIMMs has integrated SP Keys in a relocatable physical address. The system employs an IBM SSDRAM having DDR SDRAMs and a common interface through the main storage controller (MSC) for memory for both data sets and the SP Key. As there are no unique SP key components in the memory cards, the memory selftest runtime is streamlined, as the main storage selftest is a test of the entire physical memory. With the use of the registered buffer with triple detect and double correct ECC matrix. The ECC is provided throughout the entire storage domain. And the SP Key region shown is relocatable. The SP Key region within main storage is reserved and not accessible by customer applications. The Key Cache Controller and MSC have programmable "offset" addresses within the Main Storage. In the preferred embodiment the relocatable physical segment or band of storage is 256 MB and that is reserved as a relocatable SP Key region based on a Configuration Array mapping by the Storage Controller (SC Configuration Array). The absolute address provided to the Configuration array is addressed by the SC with the physical address of main storage. If during IML (start up) the target regions has too many memory correctable errors (CEs) or uncorrectable errors (UEs) then the entry for the SP Key Region based upon a configuration array mapping can be relocated.

Thus by using the SC Configuration array which maps absolute address into physical address, firmware can assign the SP Keys anywhere within a physical memory (as opposed to the fixed/non-moveable DRAM physical location in prior designs). This additionally improves Reliability, Availability and Serviceability (RAS) capability by providing for relocation of the SP Key region to another storage region if there are excessive DRAM errors located during IML startup testing. Unlike prior systems where excessive Key UEs would result in system outages if not sparing was available, the relocatable storage SP Key regions reduce system outages.

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, as one means at least one, the plural is contemplated unless limitation to the singular is explicitly stated.

What is claimed is:

1. A method for protecting memory, comprising the steps of:
   providing a plurality of like physical storage segments in a main memory storage of a memory subsystem, and
   assigning a physical Storage Protect Key (SP Key) region to some of said plurality of like physical storage segments into a physical address mapped from an absolute address;
   wherein said main memory storage employs DDR SDRAMs and said memory subsystem provides a common interface through a main storage controller to said main memory storage for both data and SP Keys, and during startup a memory selftest runs against the entire main memory storage of said memory subsystem to report possible errors found in testing of all memory storage elements in said main memory storage which includes SP Key regions.

2. The method according to claim 1, wherein said step of assigning a physical SP Key region uses a Storage Controller configuration array which maps absolute addresses for said SP Key region into a physical address.

3. The method according to claim 1 wherein said step of assigning the physical SP Key region is accomplished by executing firmware to assign the SP Key region anywhere within said main memory storage.

4. The method according to claim 1 wherein said step of assigning the physical SP Key region is accomplished by executing firmware to assign the SP Key region to relocate the SP Key region in said main memory storage from another storage region.

5. The method according to claim 4 wherein said step of assigning the physical SP Key region to a relocated storage region for SP Keys occurs after there has been excessive DRAM errors identified in the original said SP Key region of said main memory storage; wherein excessive DRAM errors identified in the original said SP Key region of said main memory storage would result in system outages if not sparing was available.

6. The method according to claim 5 wherein said relocation of a storage region for SP Keys occurs after said excessive DRAM errors identified in the original said SP Key region of said main memory storage during IML startup testing of said memory subsystem.

7. The method according to claim 1 wherein said SP Key region can be physically moved to different main memory storage along with integrated SP Keys of said SP Key region.

8. The method according to claim 1 wherein said step of assigning the physical SP Key region uses an Storage Controller configuration array which maps absolute addresses for said SP Key region into a physical address, and wherein the main storage controller and a key cache controller have programmable addresses within main storage which identify a relocatable physical segment that is reserved as a relocatable SP Key region for said assigning step.

9. The method according to claim 8 wherein said step of assigning the physical SP Key region is accomplished by executing firmware to assign the SP Key region to a relocatable physical address for the SP Key region in said main memory storage from another storage region after there has been excessive DRAM errors identified in the original said SP Key region of said main memory storage, and during IML startup testing of said memory subsystem said SP Key region is physically moved to a different main memory storage along with integrated SP Keys of said SP Key region to relocate the SP Key region in said main memory storage.

10. A main memory storage for a computer system, comprising: a plurality of memory elements having a physical address and an absolute address in a key controller and a main storage controller, said plurality of memory elements forming a main memory storage for said computer system, and having regions mapped for storage of relocatable SP Keys and for holding data with a common physical memory forming said main memory storage of the computer system;

Wherein said main memory storage of a memory subsystem employs DDR SDRAMs, and said memory subsystem provides a common interface through a main storage controller to said main memory storage for both data and Storage Protect Keys (SP Keys), and during startup a memory selftest runs against the entire main memory storage of said memory subsystem to report possible errors found in testing of all memory storage elements in said main memory storage which includes SP Key regions.

11. The main memory storage of claim 10 further comprising, a plurality of DRAMs for providing said memory elements and a register buffer for said DRAMs, said register buffer providing ECC protection for the contents of said DRAMs and their memory elements.

12. The maim memory storage of claim 11 wherein the ECC protection is provided for relocatable SP Keys stored in a region of said main memory storage for relocatable SP Keys.

13. The main memory storage of claim 11 wherein said register buffer provides a triple detect and double correct ECC matrix for SP Keys and data in said main memory storage.

14. The main memory storage of claim 11 wherein a DIMM memory module provides said plurality of DRAMs and said register buffer for the memory module for buffering data and SP Keys for said DRAMs and for performing ECC checking of said data and SP Keys.

15. The main memory storage of claim 14 wherein the register buffer for the memory module uses an SP Key which has a physical key which consists of 7 data bits and 9 bits of ECC which is 2 bytes in length.

16. The main memory storage of claim 14 wherein said DIMM memory module has a plurality of DDR SDRAMs on a rectangular printed circuit board having a first side and a second side, a length between 149 and 153 millimeters (and optimized at 149.15 mm or 151.35 mm in length) and first and second ends having a width smaller than the length; a first plurality of connector locations on the first side extending along a first edge of the board that extends the length of the board, a second plurality of connector locations of the second side extending on the first edge of the board, a locating key having its center positioned on the first edge and located between 80 mm and 86 mm (and optimized with a locating key 1.5 mm wide centered at 81.58 or 85.67 mm) from the first end of the board and located between 64 and 70 mm (and optimized with the locating key centered at 67.58 or 65.675) from the second end of the board, and wherein each DIMM has memory regions which form part of the main storage of the mainframe computer system memory subsystem comprising one of a plurality of physical segments which are relocatable regions which contain SP Keys and data set storage in the DIMM physical memory which is spread across several DIMMs, said SP Key regions defines an arbitrary logic structure for main storage having a hard physical boundary.

17. The main memory storage of claim 16 wherein said locating key having its 1.5 mm width positioned on the first edge and centered at 81.58 mm from the first end of the board and located centered at 67.58 mm from the second end of the board.

18. The main memory storage of claim 16 wherein said locating key having its 1.5 mm width positioned on the first edge and centered at 85.67 mm from the first end of the board and located at 65.675 mm from the second end of the board.

* * * * *